United States Patent [19]

Breidenthal, Jr.

[11] Patent Number: 4,468,241

[45] Date of Patent: Aug. 28, 1984

[54] METHOD AND APPARATUS FOR FIBERIZING MELTABLE MATERIALS

[76] Inventor: Robert E. Breidenthal, Jr., 6465 NE. 186th, Seattle, Wash. 98155

[21] Appl. No.: 427,166

[22] Filed: Sep. 29, 1982

[51] Int. Cl.³ .............................................. C03B 37/06
[52] U.S. Cl. .............................................. 65/5; 65/6; 65/14; 65/16; 264/8; 264/14; 425/7; 425/8
[58] Field of Search ................. 65/5, 6, 14, 16; 264/8, 264/12, 13, 210.8, 518; 425/8, 7

[56] References Cited

U.S. PATENT DOCUMENTS

| | | | |
|---|---|---|---|
| 2,192,944 | 3/1940 | Thomas | 65/16 X |
| 3,928,009 | 12/1975 | Perry | 65/14 |
| 3,936,286 | 2/1976 | Dunkailo | 65/14 |
| 4,111,673 | 9/1978 | Natta | 65/6 |
| 4,316,731 | 2/1982 | Lin et al. | 65/5 |

FOREIGN PATENT DOCUMENTS

| | | | |
|---|---|---|---|
| 54933 | 6/1982 | European Pat. Off. | 65/16 |
| 371178 | 9/1971 | U.S.S.R. | 65/15 |
| 197707 | 7/1977 | U.S.S.R. | 65/16 |

*Primary Examiner*—Robert L. Lindsay, Jr.
*Attorney, Agent, or Firm*—Robert E. Breidenthal

[57] ABSTRACT

The high velocity gradients associated with the shear layer or boundary layer of a supersonic gas stream, especially the potential core thereof, are applied to form fibers of a melted material projected across such gradients. Optimization of the effects of such gradients is sought by sustaining the magnitude of the gradients as long as possible by minimizing shear layer growth rate and/or stabilizing the rate of vortex formation, and by synchronizing the rate of projection of melt with the rate of vortex production. Provisions such as vortex triggering or density loading are made for reducing the shear layer growth rate. Provisions are also made for intermittently feeding melt at a rate synchronized with the rate of vortex formation. Provisions for regulating the temperature in the shear layer are made such as appropriately controlling stagnation gas temperature, causing an exothermal reaction within the gas stream, or causing combustion of the gas stream within an oxygen containing fiberization chamber.

37 Claims, 5 Drawing Figures

METHOD AND APPARATUS FOR FIBERIZING MELTABLE MATERIALS

The present invention relates to new and useful improvements in methods of an apparatus for fiberization of meltable mineral or organic materials to produce products useful for thermal and/or acoustic insulation purposes and the like. More particularly the invention pertains to the formation of fibers or filaments from a melt by subjection of the latter to disruptive stresses caused by contact with a high velocity fluid stream.

The paramount object of the present invention is to provide a method of and apparatus for applying fluid dynamic principles to form a good to excellent quality fibers from a melt with a high yield fraction while realizing high efficiencies with respect to energy consumption, and with respect to equipment as well as material utilization.

An appreciation of the background of the invention may be gleaned from the following paragraphs wherein the most pertinent prior art of which I am aware is set forth.

The formation of fibers using an annular array of gas jets which impinge on a stream of molten material is illustrated in U.S. Pat. No. 2,152,423, which issued Mar. 28, 1939 to von Reis. There a rotating wheel distributes and directs the molten material into the path of high velocity jets of gas. The blast of these jets, in combination with the centrifugal effects of the rotating wheel, causes the molten material to be broken up into fine filaments and threads which quickly cool and solidify. The external nature of these jets is emphasized in U.S. Pat. No. 3,048,886, which issued Aug. 14, 1962 to Firnhaber et al., where appreciable fiberization is accomplished by jets impinging on the molten material after the latter has left the rotating wheel.

Supersonic nozzles have been proposed for the rapid cooling of fibers in U.S. Pat. Nos. 3,811,850 (which issued May 21, 1974 to Dobo) and 4,001,357 (which issued Jan. 4, 1977 to Walz et al). From a hole in the bottom of a crucible, the molten material is withdrawn using a coaxial supersonic nozzle, or channel. The purpose of the attendent supersonic flow here is to rapidly draw out and cool the extruded fiber. Note that the supersonic nozzle is downstream of the point of introduction of the melt into the gas flow, with the melt being introduced coaxially with the flow prior to the flow being accelerated to a supersonic velocity. It is very important to observe that the melt is not moved to encounter a supersonic stream at a high angle of incidence thereto.

Other patents of incidental interest which are largely cumulative with respect to the prior art discussed above comprise the following: U.S. Pat. Nos. 3,015,127 (issued Jan. 2, 1962 to Stalego); 3,174,182 (issued Mar. 23, 1965); 3,048,886 (issued Aug. 14, 1962 to Firnhaber et al); 3,219,425 (issued Nov. 23, 1965 to Stalego); 3,634,055 (issued Jan. 11, 1972 to Paymal); 3,806,289 (issued Apr. 5, 1972 to Schwarz); and 4,111,673 (issued Sept. 5, 1978 to Van Natta).

A broad aspect of the invention involves, in the process of fiberizing a melted material within a gaseous ambient environment and within which a stream of melt is directed laterally into a high velocity stream of gas, the improvement comprising the step of accelerating the gas stream to a supersonic velocity at a position spaced upstream of the location at which the melt is directed thereinto such that at least a portion of the gas stream retains a supersonic velocity at said location, whereby the melt is stressed by the high velocity gradients bounding the supersonic flow.

Another broad aspect of the invention involves, in apparatus for fiberizing a meltable material wherein means are provided for laterally directing, within a fiberizing chamber, a stream of melt into a high velocity gas stream, the improvement comprising means for accelerating said gas stream to a supersonic velocity at a position spaced upstream of the location at which the melt is directed thereinto with the spacing being such that at least a portion of the gas stream retains its supersonic velocity at said location, whereby the melt is stressed by the high velocity gradients bounding the supersonic flow.

The purposes, features and advantages of the invention will be most readily and best appreciated in the light of the following description of preferred embodiments thereof, such description being given in conjunction with the accompanying drawings, wherein.

Figure 4:
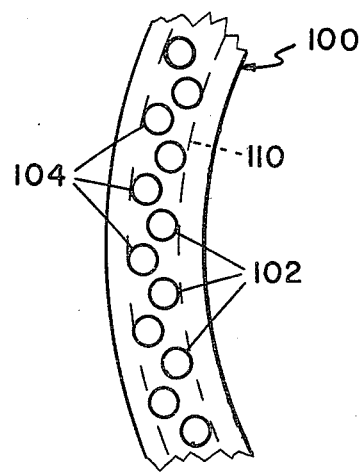
Figure 5:
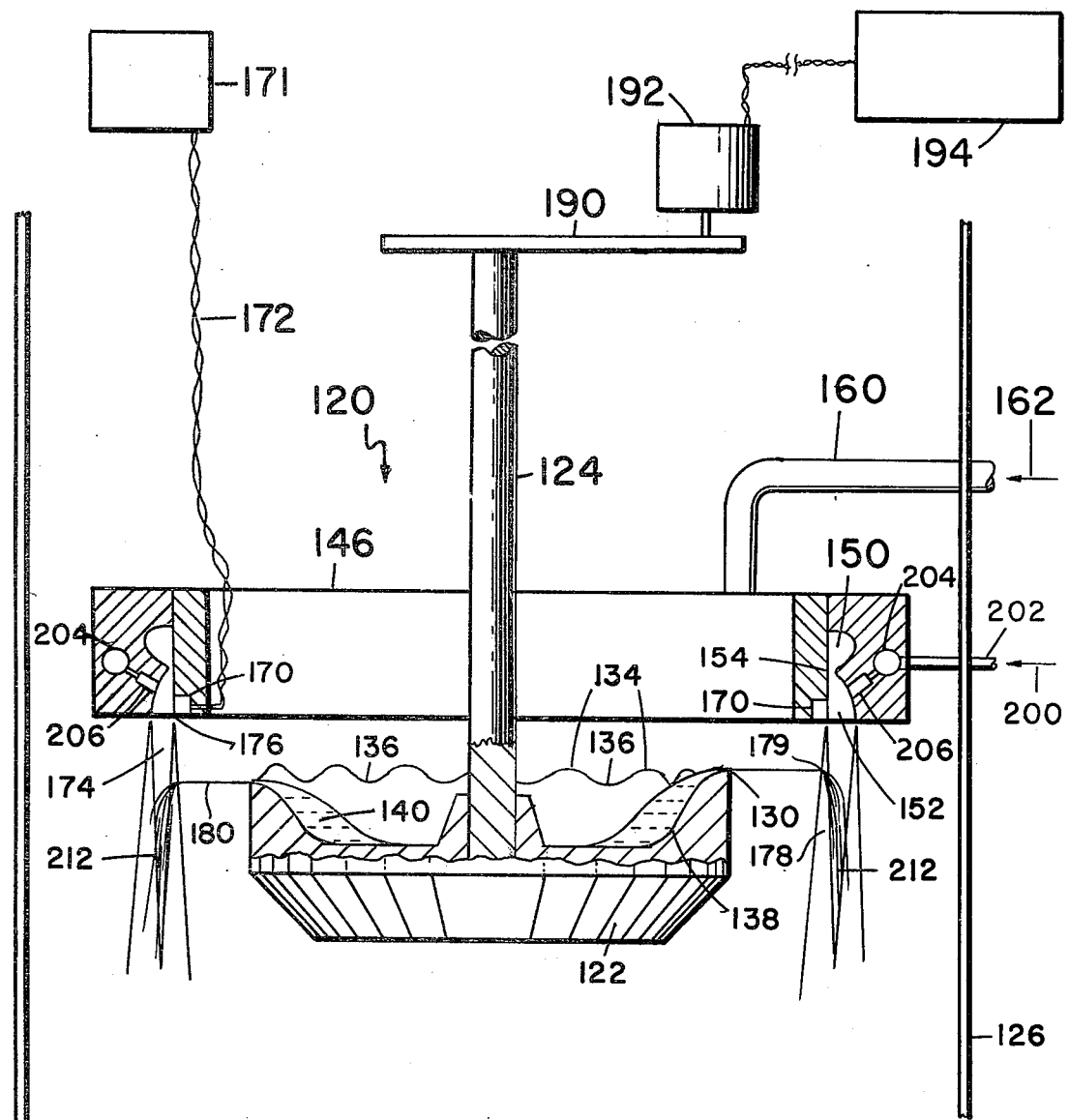

FIG. 4 pertains to a modified nozzle ring incorporating a plurality of discrete nozzles rather than a continuous annular nozzle, and is a fragmentary bottom view of such modified ring nozzle structure showing the nozzle exits, with the plenum or feed manifold for such nozzles being shown in dashed outline; and, FIG. 5 is a central vertical section of a modified fiberizing unit that employs a modulation melt distributor together with means for increasing jet density as well as for periodically forming vortices in the boundary of the jet as it emerges from the nozzle structure.

Figure 1:
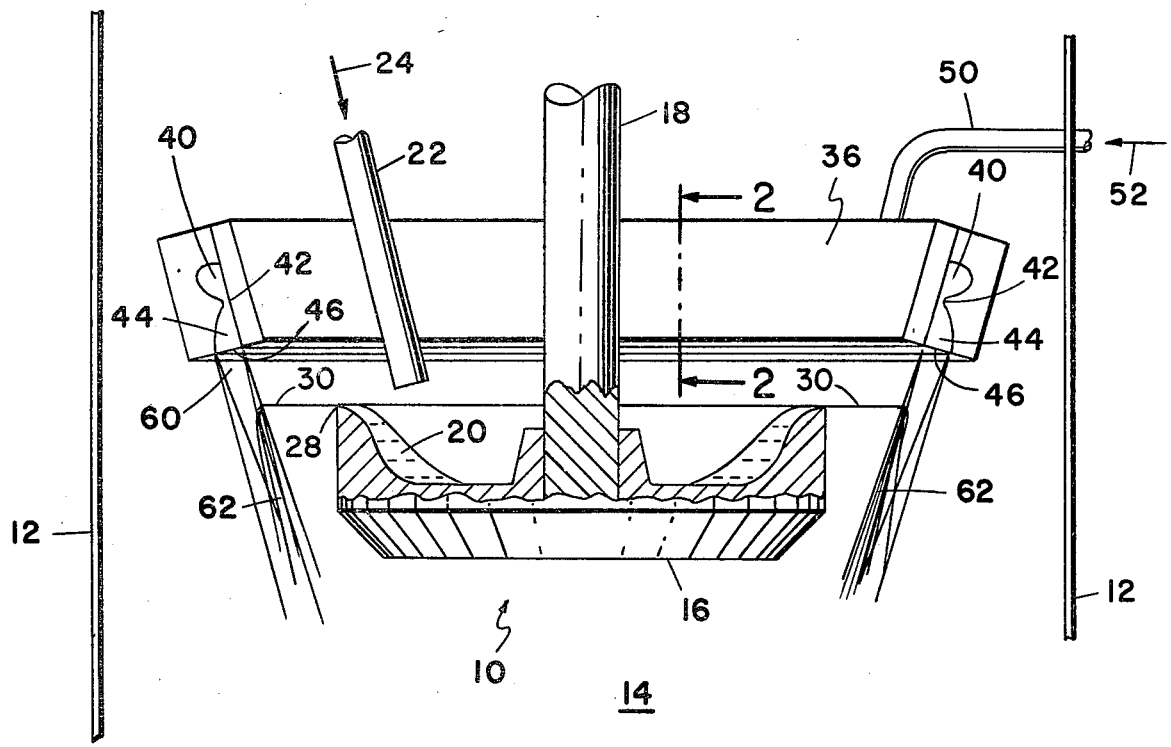
FIG. 1 is a central vertical sectional view of the fiberizing apparatus, with the drive shaft being shown partially in elevation, and with conventional supporting structure being omitted, and with any illustration of the fiberized product remote from the plane of the section also being omitted.
Figure 2:
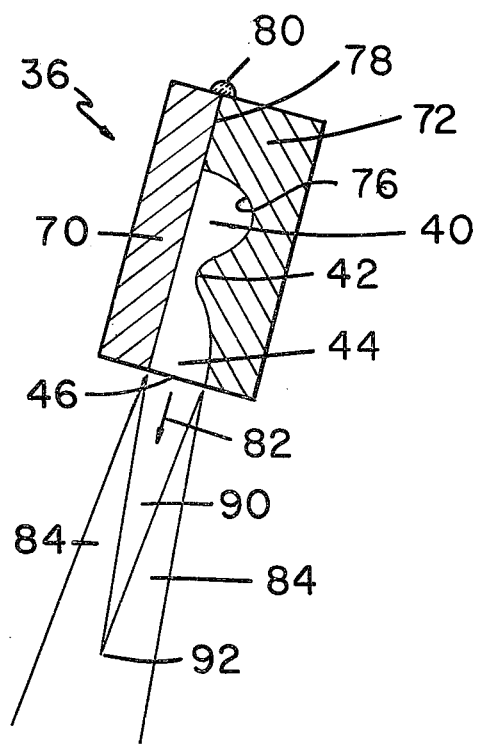
FIG. 2 is an enlarged transverse sectional view of the annular supersonic jet nozzle taken upon the plane of the section line 2—2 in FIG. 1, and illustrates features of the jet produced thereby.
Figure 3:
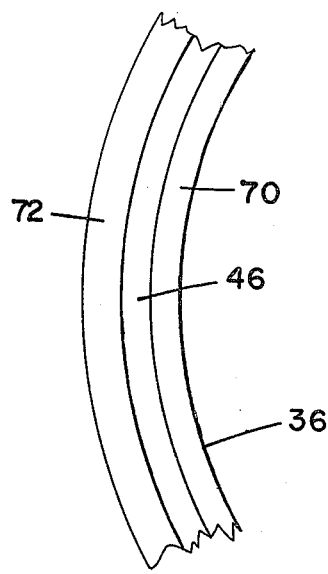
FIG. 3 is a fragmentary bottom view of the nozzle ring shown in FIGS. 1 and 2.

Reference is now made to the drawings, wherein like reference numerals designate like parts throughout the various views, with attention being initially directed to the form of the invention shown in FIGS. 1, 2 and 3.

The reference numeral 10 designates the fiberizing unit or apparatus generally, the same being comprised of a conventional housing that includes a vertical shell or cylindrical steel wall 12 that defines a fiberizing zone or chamber 14 therein.

A steel melt distributing wheel or bowl 16 is fixed to the lower end of a vertical drive shaft 18 that is driven in rotation about its axis by conventional means, not shown.

Conventional means are provided for continously supplying a molten material 20 into the bowl 16, such as through a pipe 22 as indicated by the arrow 24.

The apparatus as thus far described is conventional and includes, as will be understood, conventional means, not shown, for collecting or collecting and removing the fiberized product from the lower end of the housing or shell 12.

The melt distributing wheel or bowl 16 serves in a conventional manner to fling melt 20 radially outward over its rim 28 as indicated at 30.

The present invention departs sharply from the conventional technique of subjecting the distributed melt 30 to disruptive blasts in that, according to the present invention, the distributed melt 30 is fiberized by encountering the shear layers of a supersonic jet. Such is accomplished by the provision of an annular supersonic jet assembly or supersonic nozzle ring indicated a 36. The ring 36 is of greater diameter than the bowl 20 and is disposed at a height so as to be closely spaced above the path of the melt 20 as it is flung or thrown from the bowl 16 along its path 30, as clearly shown in FIG. 1.

The supersonic nozzle ring 36 is hollow and has defined therein an annular distributing manifold or plenum chamber or space 40 that opens downwardly through an annular constriction or throat 42 that in turn opens into an annular expansion section 44 that monotonically increases in its radial extent to communicate at the nozzle exit 46 with the space 14 at the bottom of the nozzle ring 36.

A high pressure fluid, such as steam or compressed air, is fed into the plenum 40 by a pipe 50 connected to the supersonic jet nozzle structure 36 from a source thereof as indicated by an arrow 52 and as more fully explained hereinafter, an annular supersonic jet 60 is directed downwardly from the nozzle structure 36. The arrangement is such that the stream of melt 30 is projected into the supersonic jet 60 at a high angle of incidence thereto and at a position closely spaced to the nozzle exit 46, and such impingement of the melt stream 30 upon the supersonic jet 60 and the sharply defined shear layers thereof in close proximity to the nozzle structure 36 results in the material of the melt stream 30 being broken up and stretched into long and very thin filaments 62 that are rapidly cooled and solidified as they are accelerated and transported downwardly by the fluid constituting the supersonic jet 60 for collection as finished product at the bottom of the housing or shell 12.

The construction of the supersonic nozzle structure 36 and the formation of the supersonic jet 60 will be better understood upon reference to FIG. 2. Fluid introduced into the plenum or annular chamber 40 via the pipe 50 is at a high pressure, termed stagnation pressure, and moves therein at a relatively low velocity by reason of its relatively high volume as compared to the cross section of a constriction or throat 42. Supersonic flow is generated when the high pressure gas in the plenum 40 is initially accelerated to sonic velocity which it attains at the constriction or throat 42 with the fluid then being accelerated to supersonic velocity during its expansion on downward movement through the expansion section 44 according to well known principles of fluid flow and thermodynamics. Standard textbooks in dealing with compressible fluid flow tabulate the ratio of the pressure in the plenum 40 to the pressure in the expansion section 44 necessary to realize any desired jet Mach number. Also listed in the standard tables are the ratio of the cross sectional area of the throat 42 to the cross sectional area of the discharge end of the expansion section 44 for any desired jet Mach number. With such data at hand, those familiar with the art can readily compute and fabricate an effective configuration for the plenum 40, throat 42 and expansion section 44 given an overall desired flow rate, a given source of fluid pressure, and a desired jet Mach number. In the practice of the present invention a jet Mach number in excess of two is generally preferred, though Mach numbers as low as one are of some though relatively modest benefit.

The nozzle ring 36 can be most easily fabricated from mating secured inner and outer rings 70 and 72. The inner ring 70 has a frusto-conical outer surface 74 which jointly defines with the machined inner surface 76 the plenum 40, the throat 42 and the expansion section 44. Construction in such a manner affords convenient, economical and precise configuration of the supersonic jet defining structure. The rings 70 and 72 form a seal at their common frusto-conical juncture 78 and such rings 70 and 72 can be secured together and the seal therebetween further assured by a bead of welding 80. The ring nozzle 36 like the bowl 16, the drive shaft 18 and the pipes 22 and 50, is preferably made of steel.

It will be noted in FIGS. 1 and 2 that the ring nozzle 36 is downwardly and inwardly inclined so that the annular jet 60 is directed to be downwardly convergent. This is attained efficaciously by reason of the preferred manner of nozzle fabrication outlined above and is preferred for the reason of further assuring a high angle of incidence for the melt stream 30 as it impinges upon the supersonic jet 60. Indeed, as may be preferred, the angle of incidence can be such that the melt stream 30 has a significant velocity component directly opposite the velocity of the center of the supersonic jet 60. Such enhances the efficiency of the fiberization and tends to direct convergence of product 62 toward the center of the housing.

Once the supersonic stream or jet 60 exits the nozzle assembly structure 36 at 46 as indicated by the arrow 82, shear layers 84 form which bound the inner and outer sides of the jet 60 and relatively stagnant ambient fluid or gas 86 in the zone 14. The latter is relatively quiescent, so that a large velocity gradient exists within the shear layers. If the nozzle 36 is optimally designed, the shear layers 84 are initially relatively thin. They grow as they move downstream until at some downstream position 90 they merge. The flow of the jet 60 between the shear layers 84 is termed the potential core 90 of the jet and it terminates where the shear layers merge at 92. For a supersonic, of Laval, nozzle of correct design for the downstream pressure, the supersonic flow is correctly expanded to the pressure of its environment 86 and no shock or expansion waves are necessary to correct a pressure imbalance. In this case the velocity within the potential core is uniform and undiminished until the potential core ends at 90. Thereafter the maximum velocity and velocity gradients continually decrease with increasing distance from the nozzle.

The fiberization of a molten stream by a supersonic jet of a fluid is due to the impressed stresses resulting from a velocity gradient in the flow. The extremely higher velocity gradients result in much higher stresses that in turn greatly reduce the fraction of molten material which is not successfully elongated into fibers before it cools and freezes. Nonfibrous, spherical "shot" represents a wastage of raw material and energy.

Supersonic shear layers 84 are able to maintain a high velocity gradient for a much greater distance from the exit 46 for a given size nozzle than a subsonic shear layer. Thus, when the molten material 30 is transversely projected into the jet, a thin, supersonic shear layer 84 subjects the melt more rapidly to the jet-induced stresses. A second advantage of the supersonic jet over a subsonic blast is that it has been accelerated to a high velocity in an efficient, isentropic manner so that its momentum and energy are maximized. Conventional nozzles in fiberising apparatus (characterized by a convergent passageway only, and the absence of a throat followed by a divergent expansion passageway) subject the exiting blast to a series of shock waves which also reduce the kinetic energy of the blast. A third and very important unique advantage of the supersonic jet over a subsonic blast is the fact that disturbances caused by the presence of the molten material cannot disturb or deflect the oncoming supersonic jet. The full force of the supersonic jet or blast acts upon the melt.

FIG. 4 illustrates a modified supersonic nozzle structure or ring 100 that may be used in lieu of the ring 36 wherein staggered rows of axisymmetric nozzles 102 and 104 are employed rather than the continuous, or annular nozzle configuration of FIGS. 1, 2 and 3. The axisymmetric nozzles of the rows 102 and 104 thereof will be understood to have configurations such as the supersonic nozzle shown in U.S. Pat. No. 4,001,357 to include convergent and divergent sections that merge or join at a throat. It will also be understood that the upstream or convergent sections of the rows of nozzles 102 and 104 communicate with an annular manifold or plenum 110 supplied with stream or compressed gas by means not shown.

The operation of apparatus of FIG. 1 incorporating the nozzle 100 (having the array of discrete or separate Laval-type supersonic nozzles incorporated therein) is largely the same as that previously given in connection with the use of the continuous annular nozzle of FIGS. 1 through 3 and the yet to be described apparatus of FIG. 5.

Inasmuch as the annular spacing between angularly adjacent discrete nozzles is small relative to the angle subtended by the exit end of each individual nozzle (especially when alternate nozzles are radially staggered), it will be evident to those skilled in the art that virtually all melt distributed by the wheel will encounter the high velocity gradients about one or more of the discrete supersonic jets. This is true even with respect to the minor portion of melt that may approach a jet more or less tangentially with respect to its axis. Further improvements in the quality and production efficiency of fibers are believed attainable through careful control of the turbulence within the shear layers of the supersonic jet or jets in relation to the feed rate of molten material into the shear layers. It is known that the growth rate of shear layers can be substantially reduced from their normal rate by small disturbances introduced at the formation point of the shear layer. Attention is now directed to FIG. 5 wherein a modified fiberizing unit is designated at 120 which incorporates means for forcing the shear layer to grow at a reduced rate.

The unit 120 is similar to the unit 10 with distinctions being specifically pointed out. A bowl 122 is fixed to the lower end of a vertical drive shaft 124 for rotation about a vertical axis with a housing that includes a shell or cylindrical wall 126.

The bowl 122 differs from the bowl 16 in that the upper peripheral edge of the rim 130 thereof is of an undulating or scalloped form as shown at 132 to define alternating ridges 134 and valleys 136 that are smoothly contoured radially inwardly on the overall concave upper surface 138 of the bowl 122. Means, not shown, are provided for introducing a molten material 140 into the bowl 122.

A supersonic nozzle ring 146 is provided that is quite similar to the previously described ring 36 except as hereinafter specified. The jet nozzle ring 146 includes an annular plenum 150 and an annular expansion section 152 that is separated from the plenum 10 by a throat 154.

As in the case of the unit 10, a pipe 160 supplies stream or a compressed gas to the plenum 150 from a source indicated by an arrow 162.

A plurality of circumferentially spaced electromechanical transducers 170, such as piezoelectric electric devices or vibrating ribbons, are mounted in the ring 146 to bound the nozzle expansion section 152 adjacent the lower discharge end of the latter.* As to be presently explained, the transducers 170 are periodically energized either simultaneously or cyclically so as to disturb the boundary layer and force the formation of vortices in the jet 174 precisely at the position 16 where the inner shear layer 178 commences. Simultaneous energization is accomplished by a common connection 172 of all transducers 170 to a pulse or sine wave signal generator 171. Cyclic energization is accomplished by sequentially exciting each elemental transducer 170 through a separate electrical line, not shown. Each electrical connection corresponding to adjacent transducer elements 170 being energized by a rotary electrical switch or modern digital analog, not shown, of conventional design. The optimal frequency of the production of the disturbances depends upon the boundary layer thickness and flow velocity at the exit of the nozzle, and it is chosen to minimize the shear layer 178 thickness at the point 179 of impingement or introduction of a melt stream 180 flung outwardly from the bowl 122.

*suitable piezoelectric transducers are available from PCB Piezotronics, Inc., P.O. Box 33, Buffalo, New York 14225.

A means are provided to synchronize the impingement or introduction of the melt stream 180 with the arrival of turbulent vortices in the shear layer 178 so as to enhance the local shear rate about the protrusions of melt. The scalloped or undulating rim or lip 130 on the rotating wheel or bowl 122 introduces a temporal and helical modulation in the thickness and amount of melt impinging on the shear layer at any point. The wheel 122 and shaft 124 are driven via a belt and pulley assembly 190 by a synchronous electric motor 192 and a drive 194, phase-locked with the electrical drive for transducers 170. Any belt slippage in assembly 190 would be compensated by adjusting periodically the phase of drive 194, either manually or by electrical feedback control, so as to optimize the production of fiber.

Means are provided to take advantage of the fact that the spreading rate of a shear layer is reduced when the density of the jet is increased. Such increase in density is realized by providing for the introduction of a liquid, such as water, into the nozzle 146 from a source 200 through a pipe 202. The nozzle ring 146 includes a liquid manifold 204 that communicates with the expansion section 152 through a plurality of circumferetially spaced spray atomizers 206 so that the dispersed or sprayed liquid can quickly accelerate to the velocity of the jet.

For the same reason, high pressure steam may be used in pipe 190 so that when it expands through the Laval nozzle, it becomes supersaturated and liquid water droplets condense out. The resulting mixture will exhibit an increased density, thereby reducing the shear layer thickness.

In operation, the modulated stream or plurality of melt streams 180 impinge upon the supersonic jet 174 and its shear layer 178 so as to produce and transport downwardly the fiberized product 212. The efficiency of the fiberization is enhanced by the production of vortices by the transducers 170, and by the increase of density of the jet by the introduction of relatively dense liquid via the atomizers 206 for rapid entrainment in the supersonic jet 174. As previously explained, the production of vortices in, as well as the increased density of the jet diminish the rate of spread or thickening of the shear layer, so that the high velocity gradients essential to efficient fiber formation are maintained for a greater distance of travel of the blast or jet from the nozzle 146. The percentage increase in the yield of high quality fiber greatly exceeds the difference between a profitable operation and a loss or economic failure.

A factor also of great present day importance resides in the fact that a great deal less energy is required to produce a given quantity of fiber upon realization of supersonic jet fiberizing efficiency as compared to high velocity blasts heretofore employed.

The apparatus of FIG. 5 is susceptible to yet another use wherein the liquid or gas introduced to the nozzle ring 146 via the pipe 202 can be such as to react exothermally with the gas introduced to the nozzle 146 by the pipe 160 or with ambient gas within the shell 126. Ignition means, not shown, such as spark plugs and flame holders can be provided to initiate or sustain combustion. For example, the compressed gas introduced to the nozzle ring 146 can be air and the liquid or gas introduced into the expansion section 152 via the pipe 202 can be a fuel such a methane or kerosene. If desired the compressed gas introduced via the pipe 160 and the liquid (or if desirable a gas) introduced via the pipe 202 can be selected to be such as to be hypergolic in character and react spontaneously with each other on contact.

In view of the foregoing, it will be seen that quite profound benfits flow from the use of supersonic jets to fiberize a melt with such benefits being of very substantial and surprising magnitude. Not only does the use of a supersonic jet result in something analogous to a quantum jump in efficiency and energy conservation, a better quality product is produced. Furthermore, the supersonic jet lends unique collateral benefits in that the supersonic stream is not diverted from its target as the effects of the presence of the melt being fiberized are not propagated upstream. In other words the jet does not until contact is made, "feel" the melt.

Furthermore the supersonic jet is uniquely such that the life or travel path of the shear layer having the high velocity gradients therein is quite prolonged or lengthened compared to conventional subsonic jets, whereby further enhancement of the quantity and quality of fiber produced can be achieved. As previously exlained, the desired prolonging of life and travel distance of the supersonic jet can be readily increased by increasing the density thereof or controlling the vortex generation within the shear layer.

Further enlightenment on the subject of shear layers and their susceptability to control may be had on reference to the following:

G. L. Brown and A. Roshko (1974) "On Density Effects and Large Structure in Turbulent Mixing Layers", Journal of Fluid Mechanics, Vol. 64, p. 799, FIG. 15.

D. Oster, I. Wygnanski, B. Dziomba, and H. Fiedler (1978) "On The Effect of Initial Conditions on The Two Dimensional Turbulent Mixing Layer" in *Structure and Mechanics of Turbulence I* (Ed. H. Fiedler) Lecture notes in Physics, Vol. 75, p. 48, Springer and Report Tau Soe 453-77.

A suggestion as to the potential of the turbulence and the resulting efficiency of the encounter of the melt with the shear layer to spread, stretch and fiberize the former may be had from consideration of the inventor's publication:

"Structure of a Turbulent Shear Layer and Wake Using a Chemical Reaction", Journal of Fluid Mechanics, Vol. 109, 1981, Page 1.

The substance of the publications cited above as well as the disclosures of the U.S. patents mentioned previously are incorporated hereby by way of having made reference thereto.

Having now fully described my invention and its practice, it will be evident that the same is obviously susceptible to numerous variations without departing from the spirit thereof, and accordingly, referece should be made to the appended claims to ascertain the actual scope of the invention.

Having described the invention sufficiently to enable others to practice and enjoy the same, and noting that the invention is susceptible to numerous variations without departing from the spirit thereof, attention is now directed to the appended claims for an appreciation of the actual scope of the invention.

I claim:

1. In the process of fiberizing a melt comprised of a molten fiberizable material within a gaseous ambient environment and within which a stream of melt is directed laterally at a high angle of incidence into a high velocity stream of gas, the improvement comprising the step of accelerating the gas stream to a supersonic velocity at a position spaced upstream of the location at which the melt is directed thereinto such that the supersonic gas stream is bounded by a shear layer having high velocity gradients therein at said location, whereby the melt is stressed by the high velocity gradients with the sheer layer.

2. The process of claim 1, wherein the direction of the melt stream and the direction of flow of the gas stream toward which the former is directed define a plane, and wherein the acceleration of the gas stream from approximately a sonic velocity to a supersonic velocity is effected by transversely constraining the width of the gas flow in said plane in such a manner that the gas passes from a region of relatively narrow width to a region of relatively greater width so as to undergo expansion.

3. The process of claim 1, including the step of periodically varying the rate of flow of the melt stream.

4. The process of claim 3, including the step of synchronizing the rate of flow variations with the rate of vortex formation in the sheer layer bounding the supersonic flow, whereby the magnitudes of the velocity gradients encountered by the melt stream are maximized.

5. The process of claim 1, wherein the rate of growth of the thickness of the shear layer along the path of the gas stream is minimized and thus the velocity gradients therein preserved at optimum values by the step of maintaining the rate of vortex formation in the shear layer substantially constant.

6. The process of claim 5, wherein the last recited step is effected by triggering vortex formation at a rate that is a function of the average rate of vortex formation in the absence of such triggering.

7. The process of claim 6, including the step of varying the triggering rate to optimize the constancy of the rate of vortex formation.

8. The process of claim 5, including the step of periodically varying the rate of melt flow with the periodicity of such variations being synchronized with the rate of vortex formation.

9. The process of claim 1, including the step of dispersing a liquid in the gas stream at a position upstream of that at which the same attains its highest supersonic velocity.

10. The process of claim 9, wherein the composition of the liquid differs from that of the gas in which it is dispersed.

11. The process of claim 10, wherein the liquid and gas are such as to chemically react with each other exothermally, and wherein the dispersed fluid is any combustible reactant, either gaseous or liquid.

12. The process of claim 11, wherein the chemical reaction is initiated by the step of dispersing the fluid in the supersonic gas under temperature and pressure conditions such that the reaction proceeds spontaneously.

13. The process of claim 11, wherein the dispersed fluid and the gas constitute a hypergolic mixture.

14. The combination of claim 1, wherein the gaseous environment zone contains oxygen, and wherein the gas stream includes a component that is combustible with the oxygen, with the oxygen being of sufficient concentration to sustain combustion of said component in said zone.

15. The process of claim 1, wherein the gas stream is steam.

16. The process of claim 15, wherein the steam is super heated steam.

17. The process of claim 15, wherein the steam is wet steam.

18. In apparatus for fiberizing a melt of a fiberizable material wherein means are provided for laterally directing, within a fiberizing chamber, a stream of melt into a high velocity gas stream, the improvement comprising means for accelerating said gas stream to a supersonic velocity at a position spaced upstream of the location at which the melt is directed thereinto with the spacing being such that at least a portion of the gas stream retains its supersonic velocity at said location, whereby the melt is stressed by the high velocity gradients present in a shear layer bounding the supersonic flow, said means for accelerating the gas stream comprising a source of said gas, an expansion nozzle passageway communicating between said gas source and the fiberizing chamber for accelerating flow of gas therethrough, together with means for maintaining the gas source at a sufficiently high stagnation pressure to effect the defined supersonic flow, said passageway having relative sequential minimum and maximum transverse dimensions that are spaced along the travel path of gas therethrough sufficient in relation to the stagantion pressure to effect a supersonic flow velocity.

19. The combination of claim 18, wherein the spacing is such that the potential core of the gas stream extends to said location, whereby the melt is subjected to the high velocity gradients bounding the potential core.

20. The combination of claim 18, including means for causing periodic variations in the rate of flow of melt in a particular direction.

21. The combination of claim 20, wherein the last recited means periodically interrupts the melt flow in said particular direction.

22. The combination of claim 20, together with means for varying the frequency of said periodic variations.

23. The combination of claim 18 together with means for periodically triggering vortex formation adjacent the supersonic gas stream.

24. The combination of claim 23 together with means for variably controlling the frequency of said triggering.

25. The combination of claim 20 together with means for periodically triggering vortex formation adjacent the supersonic gas stream.

26. The combination of claim 18 wherein said source includes a gas plenum, and means for controlling the temperature of gas entering the plenum.

27. The combination of claim 18, including means for dispersing a liquid into the gas stream at a position upstream of its passage through the passageway at the maximum transverse diminsion of the latter.

28. The combination of claim 27, including means associated with the passageway for igniting a combustible mixture, whereby combustion occurs in the supersonic stream when the gas in the plenum includes oxygen and the liquid is a fuel.

29. The combination of claim 18, including means for dispersing a liquid in the gas stream prior to the latter attaining its maximum velocity and thereby increasing the average density of the supersonic gas stream.

30. The combination of claim 18, including combustion ignition means in fiberizing chamber, whereby combustion can occur about the supersonic gas stream when the chamber contains oxygen and the gas stream contains a fuel.

31. The combination of claim 18, wherein the means for directing the melt includes a wheel mounted for rotation about a vertical axis, said wheel having a concaved upper surface and a crenulated periphery, whereby a melt on the wheel is preferentially flung outward from the rotating wheel through valleys defined between adjacent crenulations.

32. The combination of claim 31, including means for adjustably controlling the rate of rotation of the wheel and thereby also controlling the frequency of pulsations of melt flow flung outwardly from the wheel in any particular direction.

33. The combination of claim 32, together with means for controlling the rate of feeding of melt to the wheel.

34. The combination of claim 18, wherein the passageway has a continuous annular configuration disposed in a coaxial relationship with the means for directing the melt.

35. The combination of claim 18, wherein there is a plurality of discrete passageways disposed in an annular array in a coaxial relationship with the means for directing the melt, with said gas source including a gas distributing plenum common to all the passageways.

36. The combination of claim 35, wherein circumfirentially adjacent passageways are alternately relatively near and remote from the axis of the array, whereby the angular spacing of adjacent passageways is minimized.

37. The combination of claim 35, wherein each of said passageways defines a Laval-type nozzle.

* * * * *